(12) United States Patent
Min et al.

(10) Patent No.: US 11,164,383 B2
(45) Date of Patent: Nov. 2, 2021

(54) AR DEVICE AND METHOD FOR CONTROLLING THE SAME

(71) Applicant: LG ELECTRONICS INC., Seoul (KR)

(72) Inventors: Dongog Min, Seoul (KR); Daemyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 16/499,581

(22) PCT Filed: Aug. 30, 2019

(86) PCT No.: PCT/KR2019/011228
§ 371 (c)(1),
(2) Date: Sep. 30, 2019

(87) PCT Pub. No.: WO2021/040107
PCT Pub. Date: Mar. 4, 2021

(65) Prior Publication Data
US 2021/0209853 A1    Jul. 8, 2021

(51) Int. Cl.
*G06T 19/00* (2011.01)
*G06F 3/01* (2006.01)
(Continued)

(52) U.S. Cl.
CPC ........ *G06T 19/006* (2013.01); *G02B 27/0172* (2013.01); *G06F 3/012* (2013.01);
(Continued)

(58) Field of Classification Search
None
See application file for complete search history.

(56) References Cited

U.S. PATENT DOCUMENTS 10,241,566 B2 *  3/2019  Sawyer .............. G02B 27/0093
2016/0033770 A1 *  2/2016  Fujimaki .............. H04N 13/344
345/8
(Continued)

FOREIGN PATENT DOCUMENTS

KR    10-1044901 B1    6/2011
KR    10-2013-0117303 A    10/2013
(Continued)

*Primary Examiner* — Martin Mushambo
(74) *Attorney, Agent, or Firm* — Birch, Stewart, Kolasch & Birch, LLP

(57) ABSTRACT

Disclosed is an AR device and method for controlling the same. According to an embodiment of the present disclosure, the method for controlling the AR device computes a distance between the AR device and a capturing device connected with the AR device via wired/wireless communication and receives an angle of the capturing device and computes an angle of the AR device. The method determines information related to a distance to a real object captured by the capturing device, computes an augmented position of a virtual object corresponding to the real object, and displays the virtual object in the augmented position on a display. The AR device of the present disclosure may be associated with an artificial intelligence module, a robot, a virtual reality (VR) device, a device related to a 5G service, and the like.

18 Claims, 20 Drawing Sheets

(51) Int. Cl.
  *G06T 7/50* (2017.01)
  *G06T 19/20* (2011.01)
  *H04W 72/12* (2009.01)
  *G02B 27/01* (2006.01)
  *H04L 5/00* (2006.01)

(52) U.S. Cl.
  CPC ............... *G06T 7/50* (2017.01); *G06T 19/20* (2013.01); *H04W 72/1289* (2013.01); *G02B 2027/0134* (2013.01); *G02B 2027/0178* (2013.01); *G06T 2219/2004* (2013.01); *G06T 2219/2016* (2013.01); *H04L 5/0048* (2013.01)

(56) References Cited

U.S. PATENT DOCUMENTS

| | | | |
|---|---|---|---|
| 2016/0078680 A1 | 3/2016 | Reif et al. | |
| 2016/0124502 A1* | 5/2016 | Sawyer | G02B 27/017 345/633 |
| 2017/0148168 A1* | 5/2017 | Lindner | G06T 5/50 |
| 2017/0192620 A1* | 7/2017 | Kim | G02B 27/0179 |
| 2019/0378280 A1* | 12/2019 | Cho | G06T 7/246 |
| 2020/0202567 A1* | 6/2020 | Fitzgibbon | G06T 7/80 |
| 2020/0250400 A1* | 8/2020 | Nakamura | G02B 27/0172 |

FOREIGN PATENT DOCUMENTS

| | | |
|---|---|---|
| KR | 10-1319525 B1 | 10/2013 |
| KR | 10-2016-0073025 A | 6/2016 |
| KR | 10-2019-0048635 A | 5/2019 |

\* cited by examiner

[Figure 1]
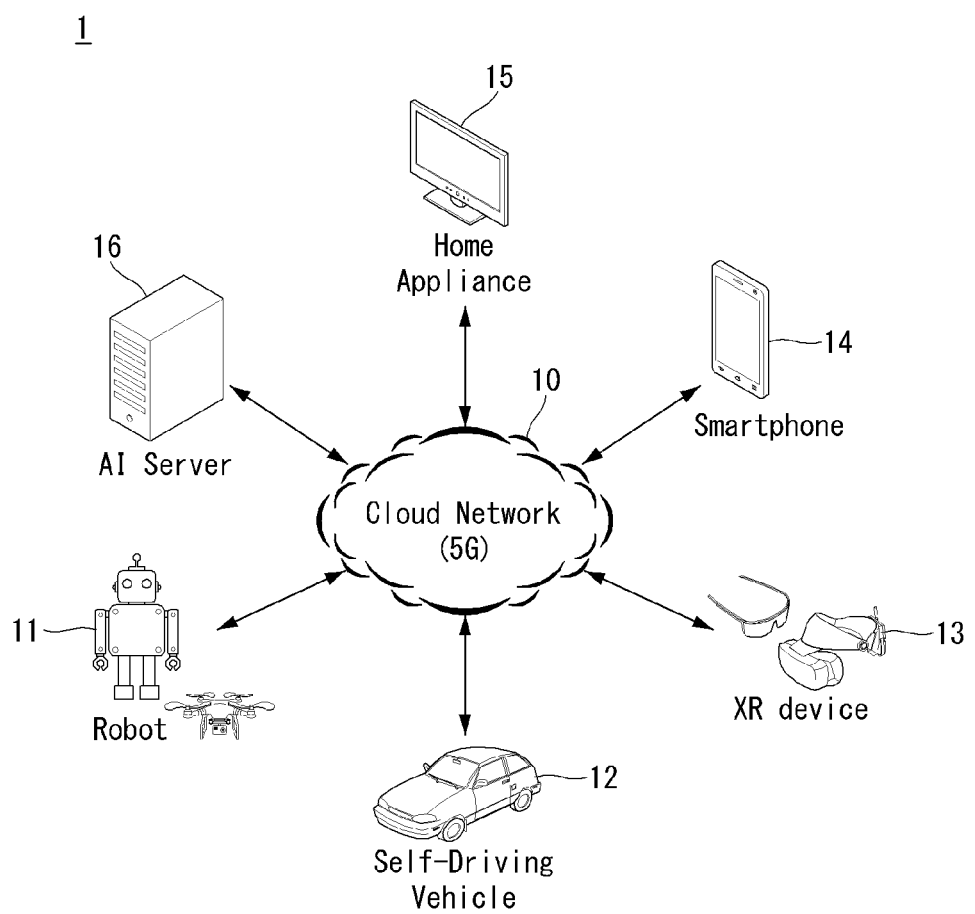

[Figure 2]
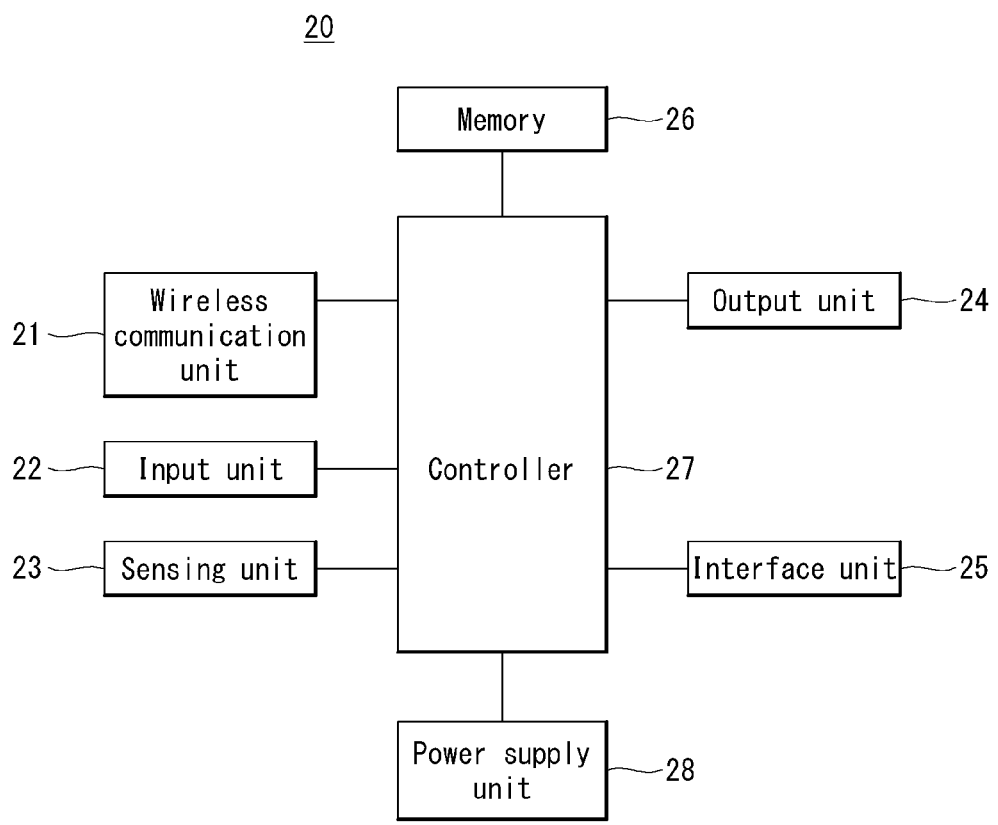

[Figure 3]
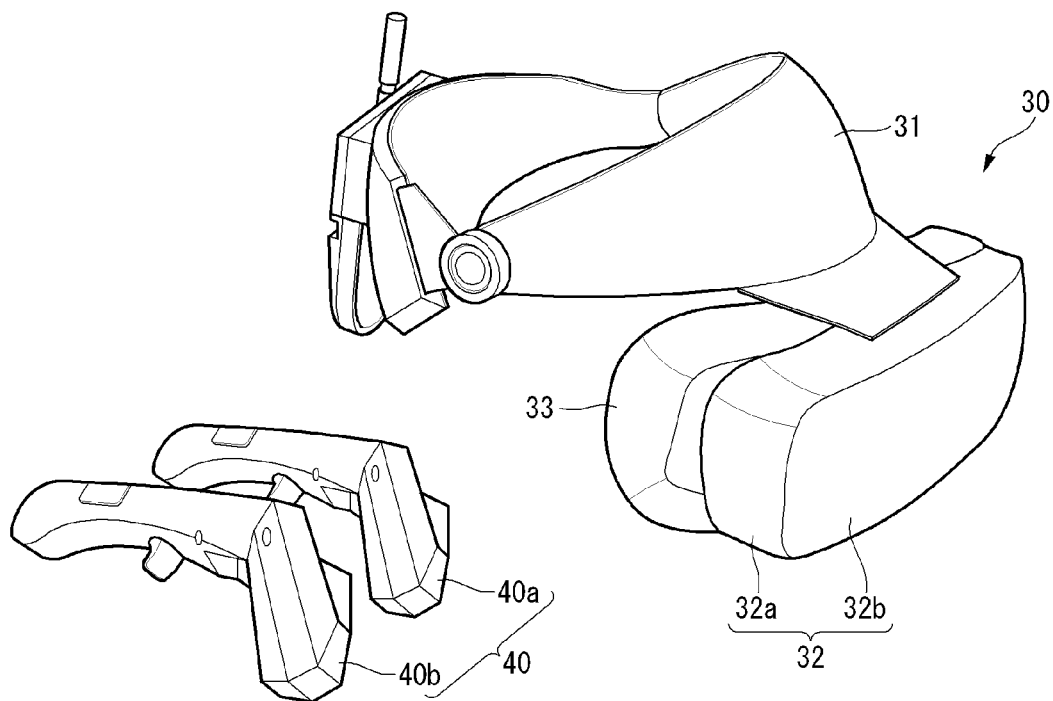

【Figure 4】
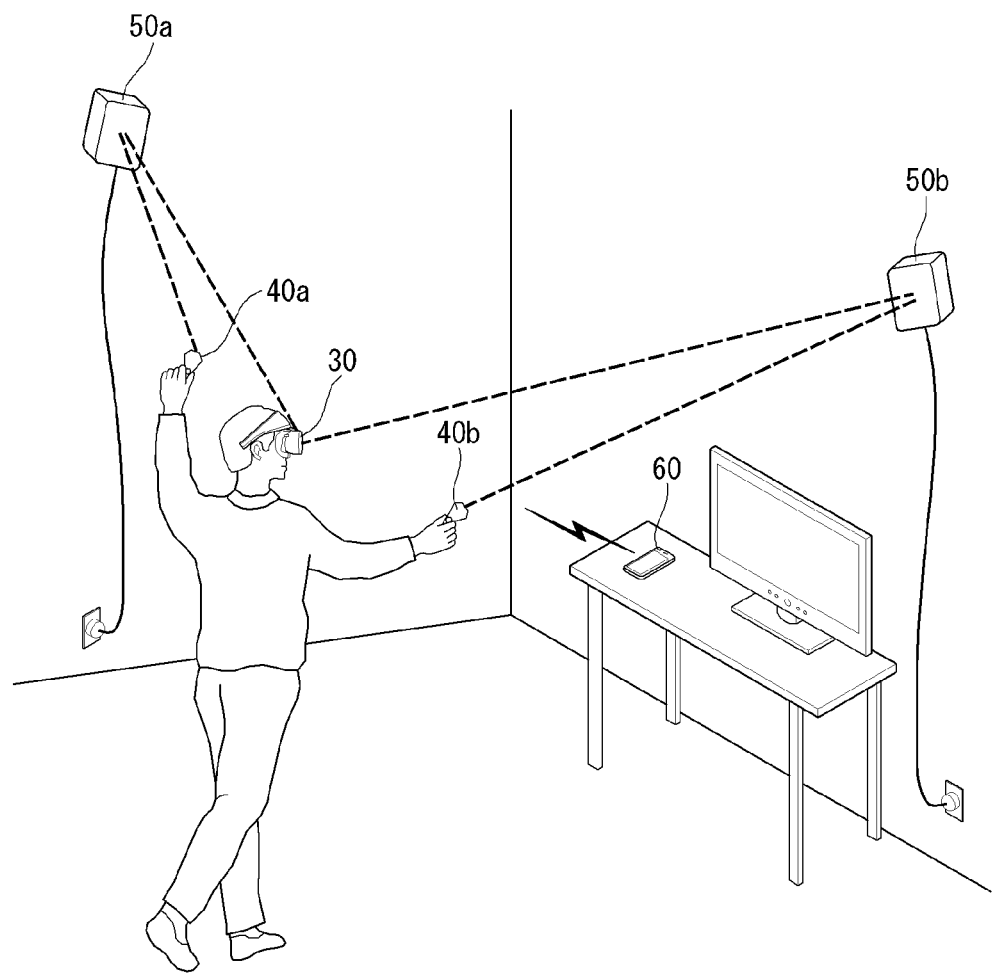

[Figure 5]
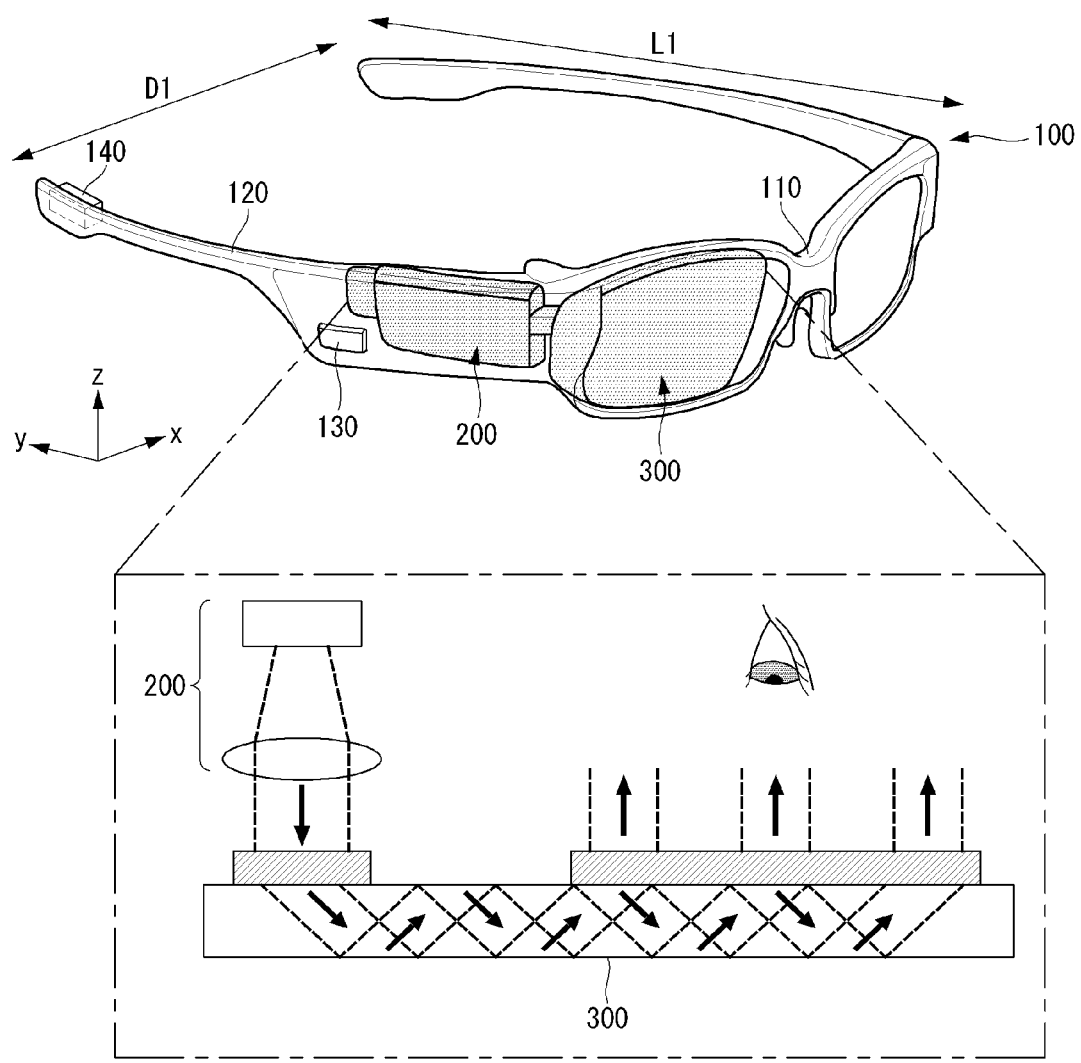

【Figure 6】
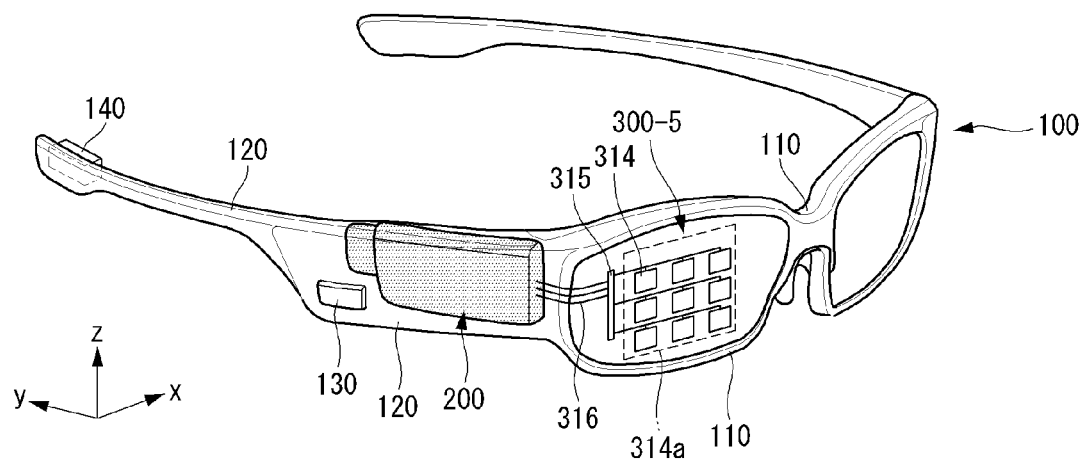
【Figure 7】
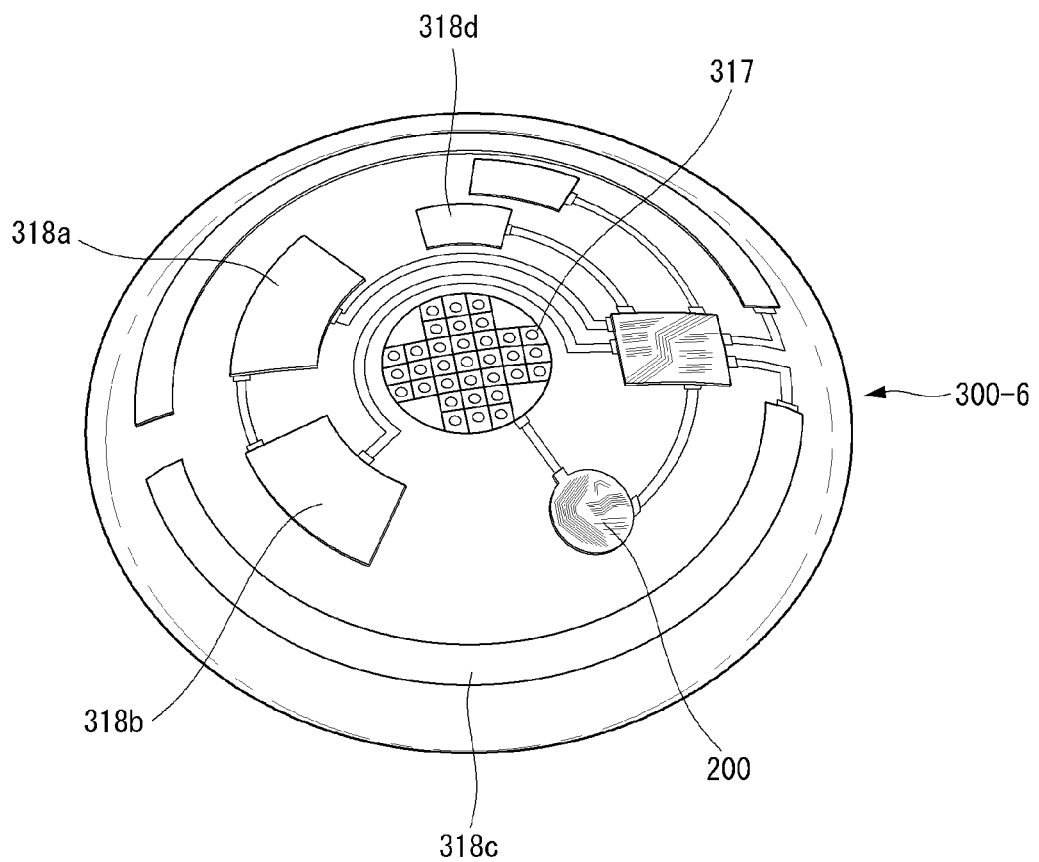

【Figure 8】
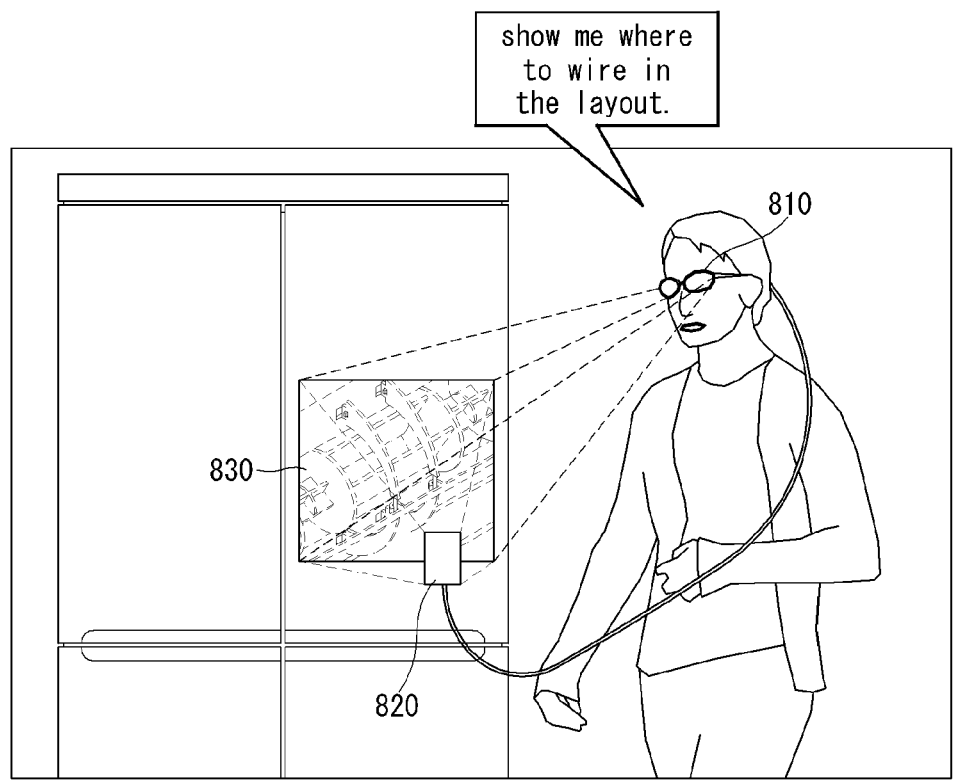

[Figure 9]
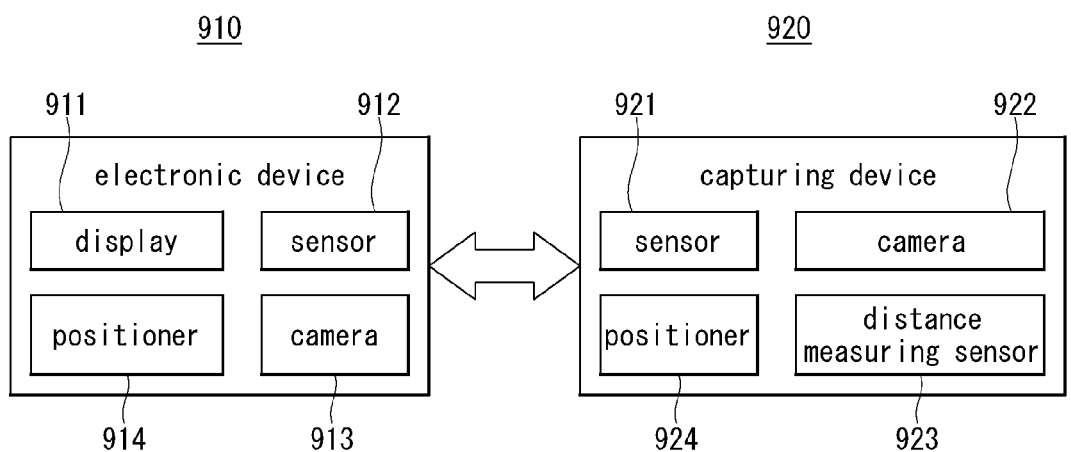

[Figure 10]
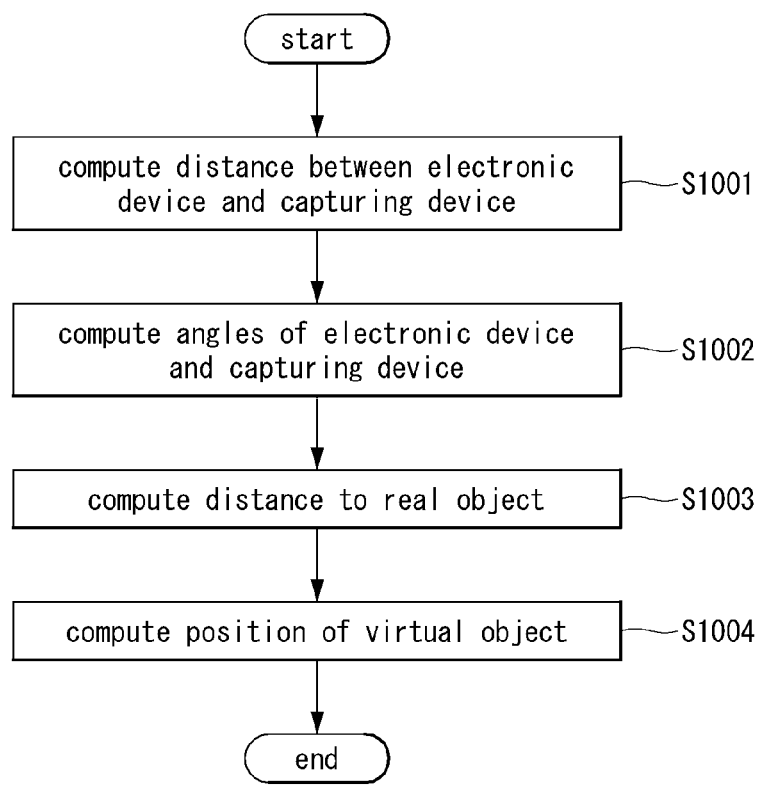

[Figure 11]
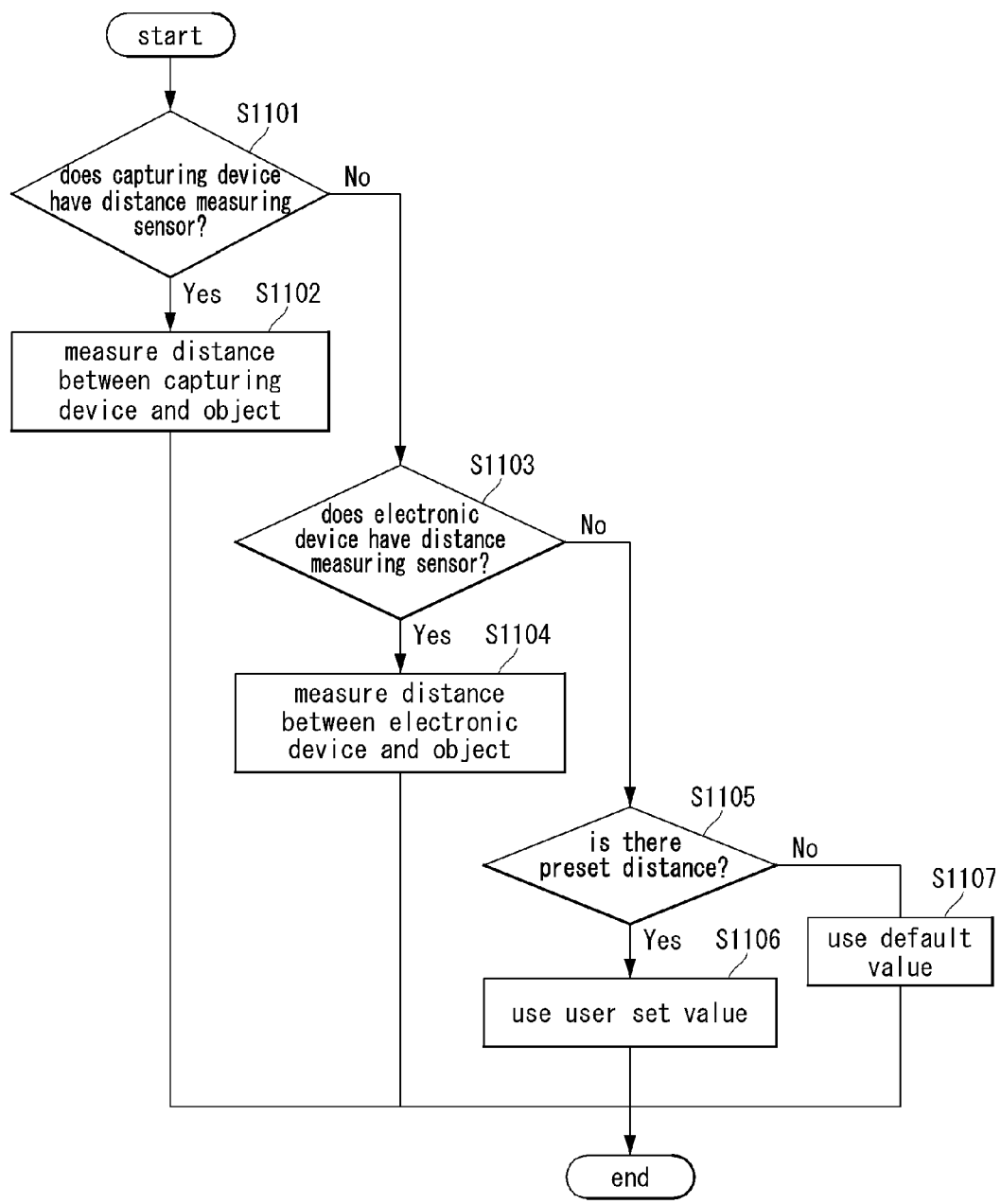

【Figure 12】
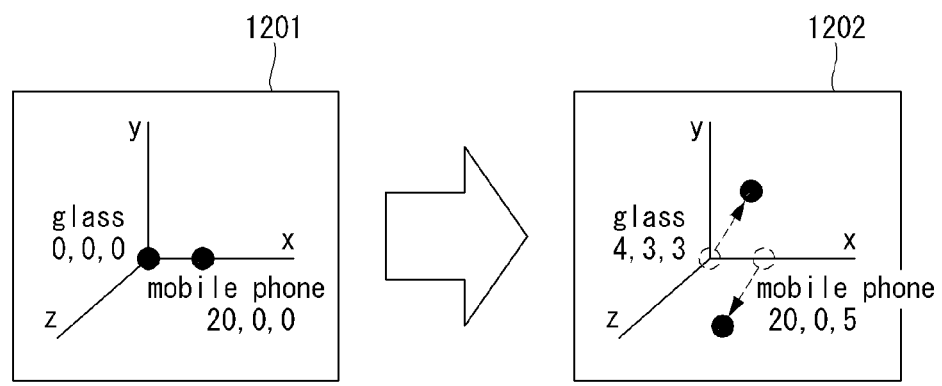

【Figure 13】
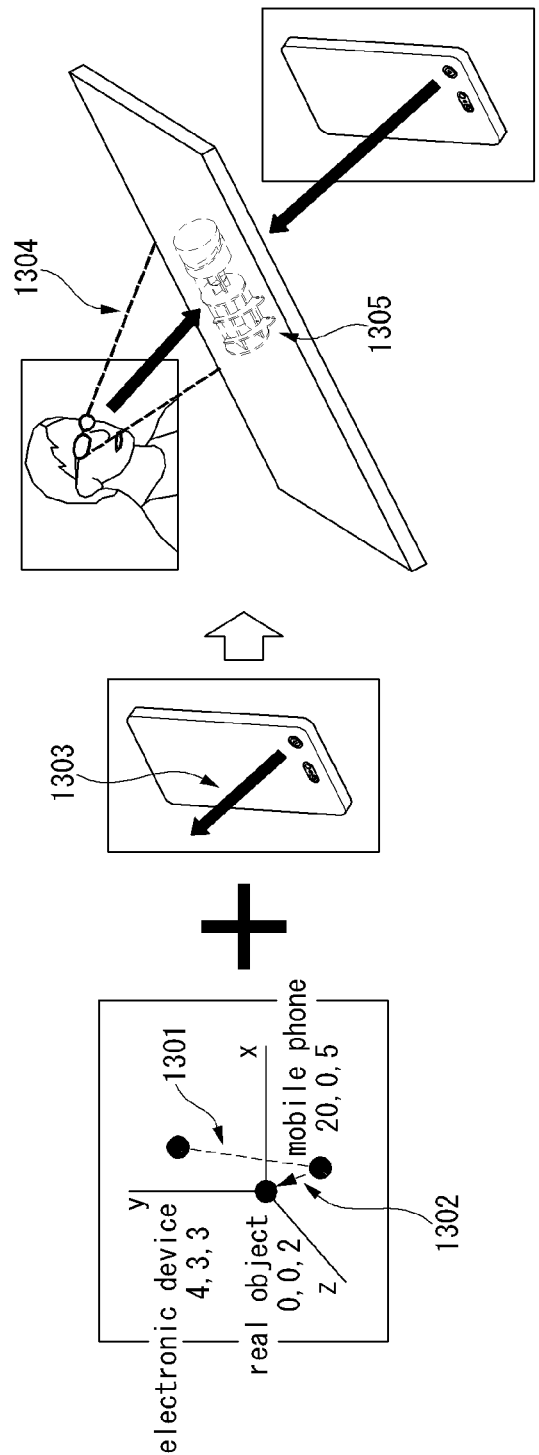

[Figure 14]
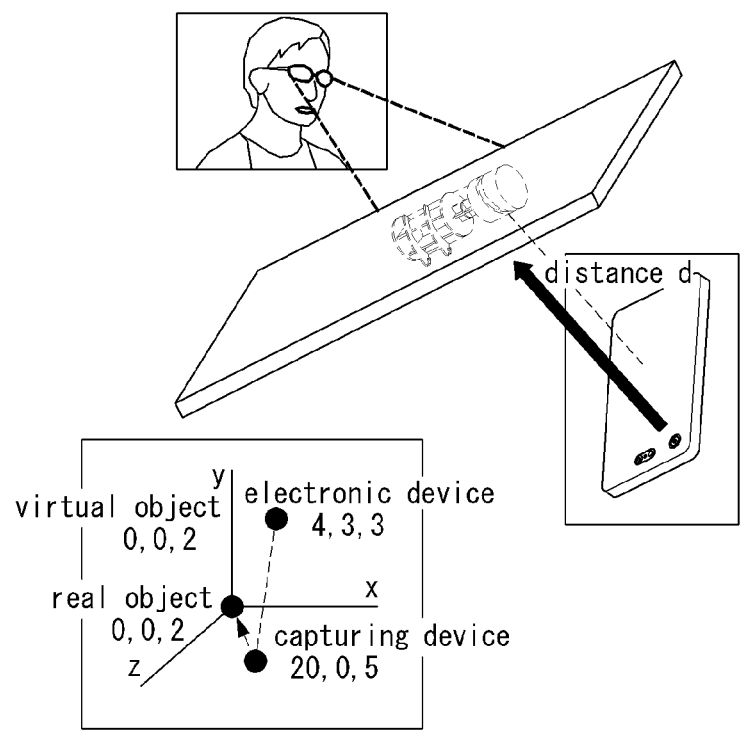

【Figure 15】
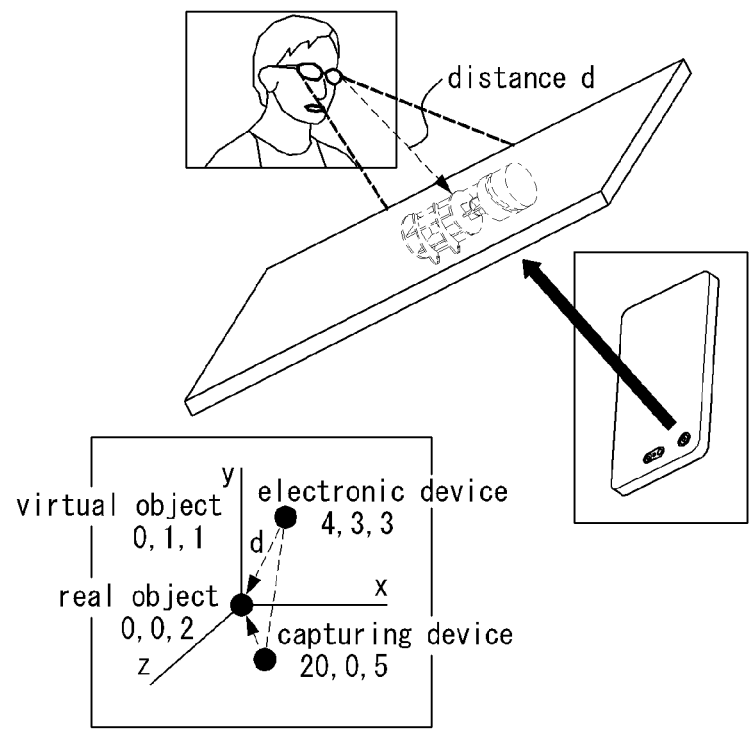

【Figure 16】
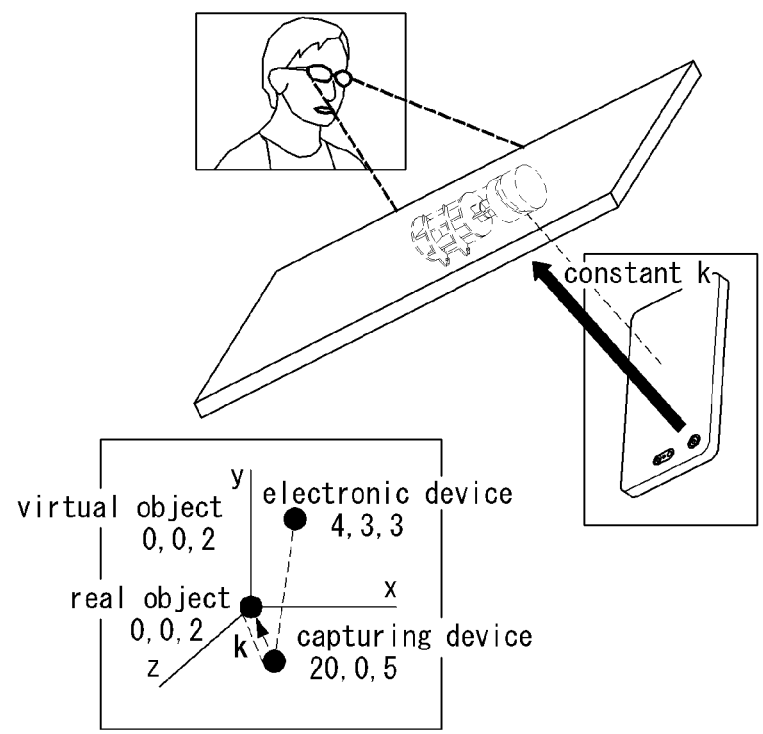

[Figure 17]
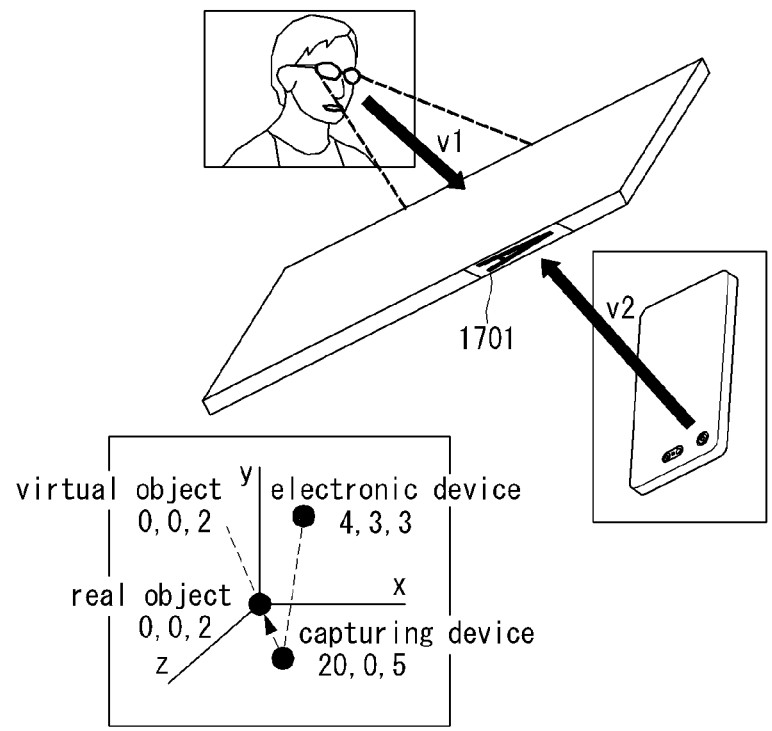
(a)
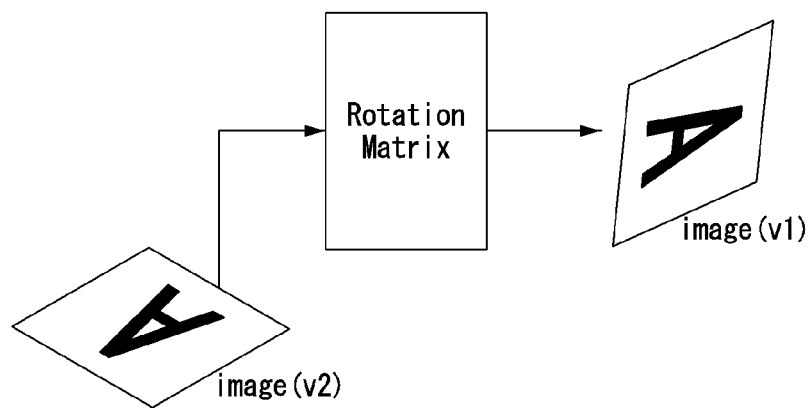
(b)

[Figure 18]
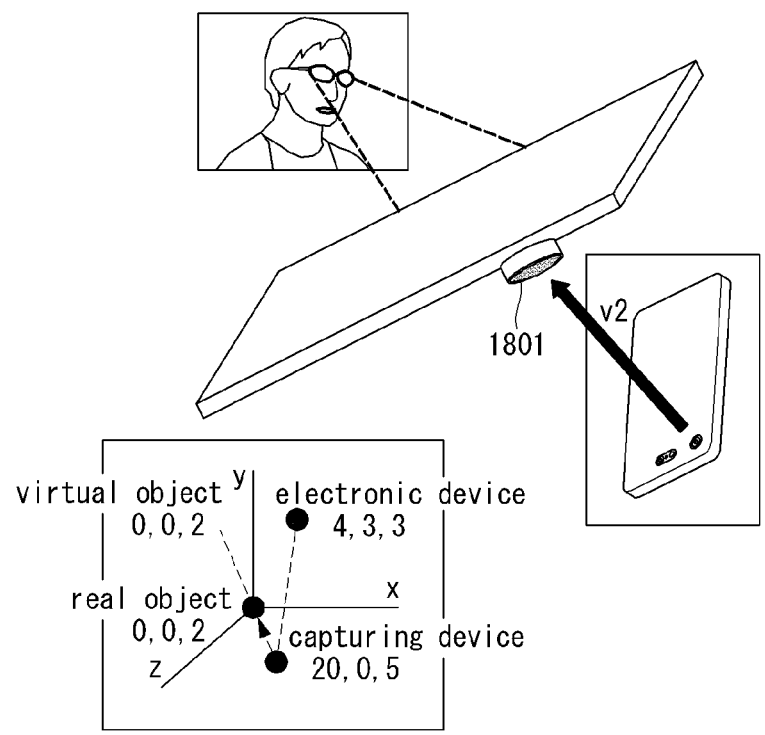

【Figure 19】
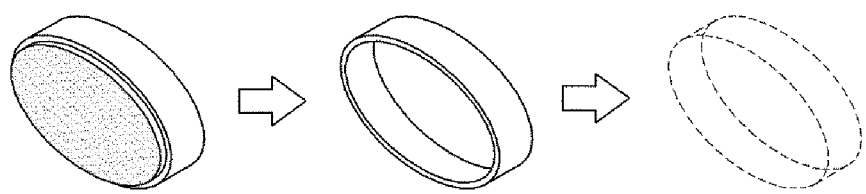
(a)
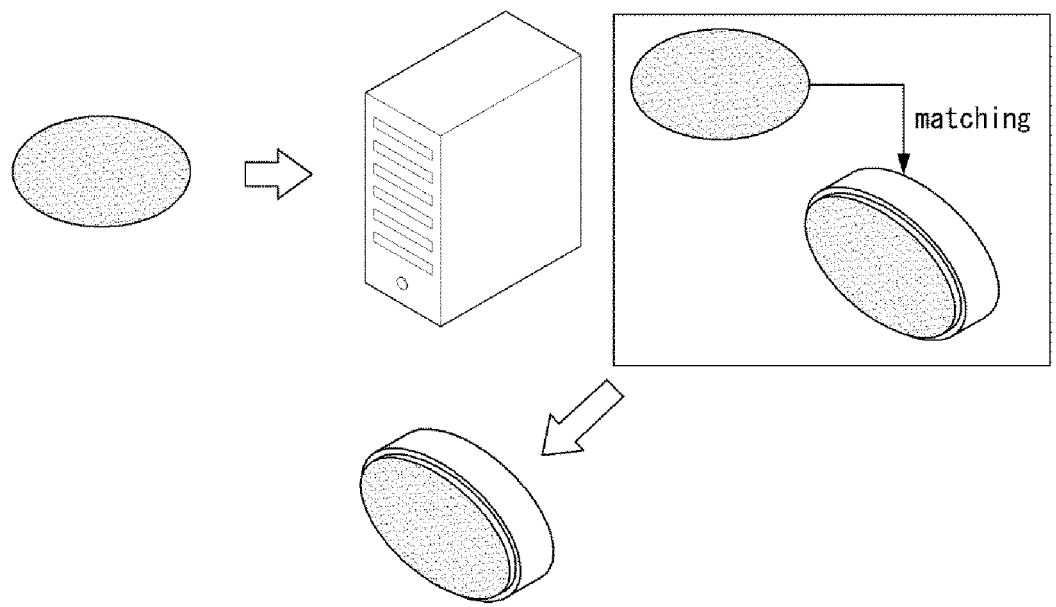
(b)

[Figure 20]
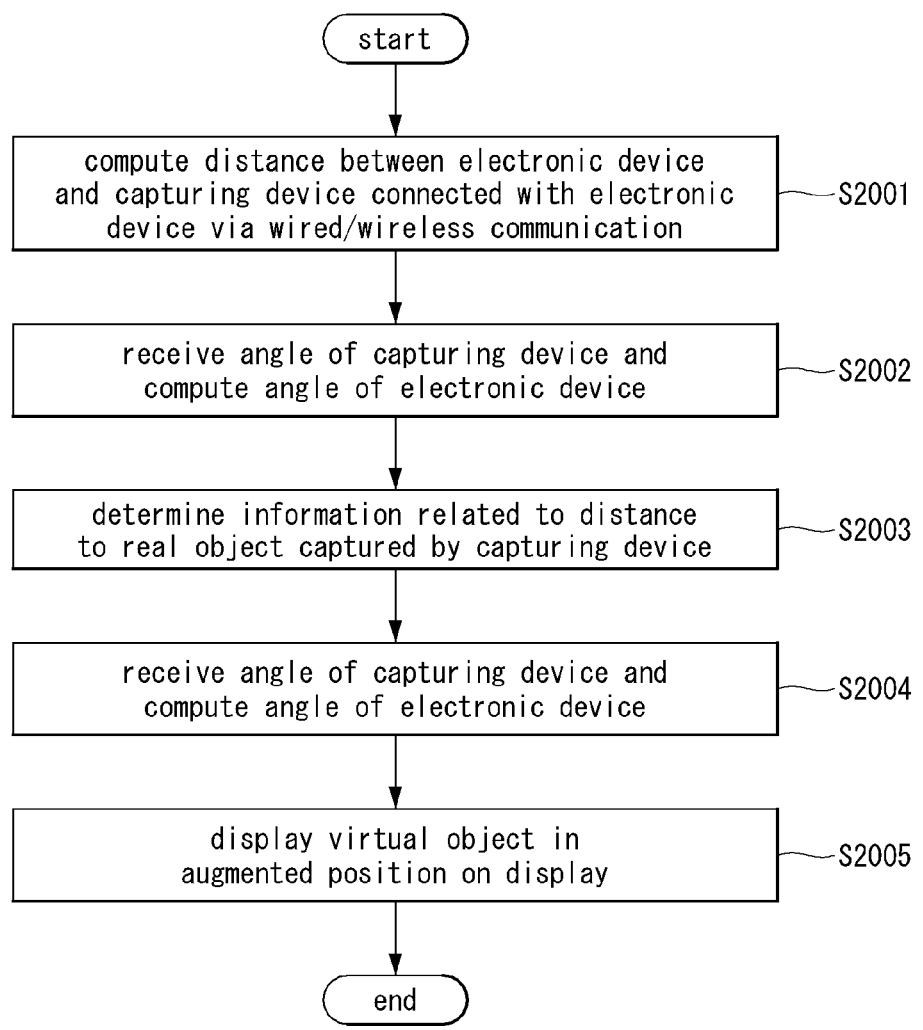

[Figure 21]
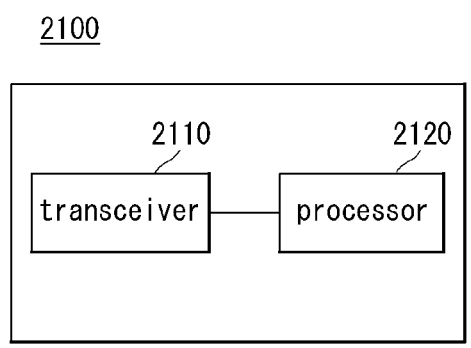

AR DEVICE AND METHOD FOR CONTROLLING THE SAME

CROSS REFERENCE TO RELATED APPLICATION

This application is the National Phase of PCT International Application No. PCT/KR2019/011228, filed on Aug. 30, 2019, which is hereby expressly incorporated by reference into the present application.

TECHNICAL FIELD

Embodiments of the present disclosure relate to an AR device and a method for controlling the AR device, and more specifically, to an electronic device used for virtual reality (VR), augmented reality (AR), or mixed reality (MR) purposes and a method for controlling the electronic device.

BACKGROUND ART

Virtual reality (VR) means a particular environment or context that is artificially created using, e.g., a computer and is similar but not real or a technology therefor.

Augmented reality (AR) is technology that allows a virtual object to look present in the original environment by synthesizing the virtual object or information with the actual environment.

Mixed reality (MR) or hybrid reality (HR) refers to creating a new environment or new information by merging the virtual world and the real world. Among others, enabling real-time interactions between things preset in the virtual and real world is called mixed reality.

A created virtual environment or circumstance stimulates the user's five senses and allows her to have a similar spatial and temporal experience to the reality while freely passing the border between the real and virtual worlds. Not simply is the user immersed in such an environment, but the user may also interact with things implemented in the environment by controlling or instructing them on a device.

Recently underway are vigorous research efforts to develop gear used in the technology.

Meanwhile, a separate camera (e.g., an endoscope) has conventionally been used to identify invisible parts (e.g., inner parts) when repairing home appliances or vehicles.

This way allows for identification of the part the camera shows but does not exactly position the part nor does it present a sufficient realistic feeling or 3D effect.

DISCLOSURE

Technical Problem

The present disclosure aims to address the foregoing issues.

An object of the present disclosure is to implement augmented reality (AR) in a more realistic and stereoscopic manner by augmenting the virtual object to the actual position of the object.

Another object of the present disclosure is to implement more realistic and stereoscopic augmented reality (AR) by augmenting the virtual object to fit the direction the user views.

Technical Solution

According to an embodiment of the present disclosure, a method for controlling an augmented reality (AR) device worn on a user's head and having a display comprises computing a distance between the AR device and a capturing device connected with the AR device via wired/wireless communication, receiving an angle of the capturing device and computing an angle of the AR device, determining information related to a distance to a real object captured by the capturing device, computing an augmented position of a virtual object corresponding to the real object, and displaying the virtual object in the augmented position on the display.

In the method of the disclosure, the virtual object may be turned from the angle of the capturing device to the angle of the electronic device and displayed.

In the method of the disclosure, the virtual object may be stereoscopically displayed in the augmented position.

In the method of the disclosure, computing the distance between the capturing device and the AR device may include computing the distance between the capturing device and the AR device based on positions of the capturing device and the AR device.

In the method of the disclosure, computing the distance between the capturing device and the AR device may include initializing the positions of the capturing device and the AR device and computing the positions, with movements of the capturing device and the AR device applied to the initialized positions.

In the method of the disclosure, the distance-related information may include at least one of a distance between the real object and the AR device, a distance between the real object and the capturing device, or a preset value.

In the method of the disclosure, computing the augmented position of the virtual object corresponding to the real object may include computing the augmented position based on the distance between the capturing device and the AR device, the angle of the capturing device, the angle of the AR device, and the distance-related information.

The method of the disclosure may further comprise receiving, from a network, downlink control information (DCI) used for scheduling reception of an image of the virtual object, wherein the image of the virtual object may be received from the network based on the DCI.

The method of the disclosure may further comprise performing an initial access procedure with the network based on a synchronization signal block (SSB), wherein the image of the virtual object may be received from the network via a physical uplink shared channel (PUSCH), and demodulation-reference signals (DM-RSs) of the SSB and the PUSCH may be quasi co-located (QCL) for QCL type D.

According to an embodiment of the present disclosure, an electronic device worn on a user's head and having a display comprises a transceiver for transmitting or receiving a wireless signal and a processor functionally connected with the transceiver, wherein the processor computes a distance between the electronic device and a capturing device connected with the electronic device via wired/wireless communication, receives an angle of the capturing device and computes an angle of the AR device, determines information related to a distance to a real object captured by the capturing device, computes an augmented position of a virtual object corresponding to the real object, and controls the display to display the virtual object in the augmented position.

Advantageous Effects

The embodiments of the present disclosure may implement augmented reality (AR) in a more realistic and stereoscopic manner by augmenting the virtual object to the actual position of the object.

The embodiments of the present disclosure may implement more realistic and stereoscopic augmented reality (AR) by augmenting the virtual object to fit the direction the user views.

DESCRIPTION OF DRAWINGS

FIG. 1 illustrates one embodiment of an AI device.

FIG. 2 is a block diagram illustrating the structure of an extended Reality (XR) electronic device according to one embodiment of the present disclosure.

FIG. 3 is a perspective view of a VR electronic device according to one embodiment of the present disclosure.

FIG. 4 illustrates a situation in which the VR electronic device of FIG. 3 is used.

FIG. 5 is a perspective view of an AR electronic device according to one embodiment of the present disclosure.

FIGS. 6 to 7 are conceptual views illustrating various display methods applicable to a display unit according to an embodiment of the present disclosure.

FIG. 8 is a view illustrating an example of use of an electronic device and a capturing device according to an embodiment of the present disclosure;

FIG. 9 is a view illustrating an example structure of an augmenting system according to an embodiment of the present disclosure;

FIG. 10 is a flowchart schematically illustrating an example method of computing the position of a virtual object according to an embodiment of the present disclosure;

FIG. 11 is a flowchart illustrating a specific example of computation of the distance to a real object;

FIGS. 12-19 are views illustrating an augmenting method according to an embodiment of the present disclosure;

FIG. 20 is a flowchart illustrating an augmenting method by an electronic device according to an embodiment of the present disclosure; and FIG. 21 is a block diagram illustrating an electronic device according to an embodiment.

MODE FOR DISCLOSURE

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

FIG. 5 is a perspective view of an AR electronic device according to one embodiment of the present disclosure.

As shown in FIG. 5, the electronic device according to one embodiment of the present disclosure may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

In addition, a display unit 300-5 employing micro LED as shown in FIG. 6 and a display unit 300-6 employing a contact lens as shown in FIG. 7 may also be used.

Referring to FIG. 6, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 7, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present disclosure may include a retina scan method.

FIG. 8 is a view illustrating an example of use of an electronic device and a capturing device according to an embodiment of the present disclosure.

Referring to FIG. 8, the user may repair an object while stereoscopically identifying a portion (or internal configuration) 830 of the object which is invisible from the outside, using an electronic device 810 and a capturing device 820 which are connected together via wired/wireless communication. For example, the capturing device 820 may capture a particular portion of a refrigerator, which the user is to repair, and transmit pre-stored layout or design information for the internal configuration of the portion to the electronic device 810 connected via wireless communication. The electronic device 810 may be worn on the user's head as are glasses, and a display of the electronic device 810 may augment and display the internal configuration image of the particular portion in the position of the actual internal configuration to fit the angle of the electronic device 810. The user may identify the internal configuration 830 and carry out repairs quickly and precisely.

In other words, an embodiment of the present disclosure may be used for identifying invisible portions, such as upon installation or repair to vehicles, home appliances, or furniture or wall perforation and, thus, resolve problems in an easier and more precise manner.

FIG. 9 is a view illustrating an example structure of an augmenting system according to an embodiment of the present disclosure.

Referring to FIG. 9, according to an embodiment, an augmenting system may include an electronic device 910 and a capturing device 920.

The electronic device 910 may include a display 911, a sensor 912, and a camera 913. The electronic device 910 may further include a positioner 914. The electronic device 910 may be in the form of being worn on the user's head to allow the user to view a particular object. For example, the electronic device 910 may be in the form of glasses.

The display 911 may be an augmented reality (AR) display device. By the display 911, the user may identify realistic and stereoscopic virtual objects.

The sensor 912 may include various sensor devices necessary to implement an embodiment of the disclosure.

The camera 913 may be a camera device.

The positioner 914 may detect the movement of the electronic device 910 and apply the movement to initialized coordinates, thereby computing the position (or coordinates) of the electronic device 910.

The electronic device 910 connects to the capturing device 920 via wired/wireless communication and may receive a virtual object from the capturing device 920.

The capturing device 920 may be a device capable of capturing a particular object. For example, the capturing device 920 may be a camera, a smartphone, or a micro camera.

The capturing device 920 may capture a particular object and provide an image or video for the particular object to the electronic device 910.

The capturing device 920 may include a sensor 921, a camera 922, and a distance measuring sensor 923. The capturing device 920 may further include a positioner 924.

The sensor 921 may include various sensors necessary to implement an embodiment of the disclosure.

The camera 922 may be, e.g., a camera device or a camera module.

The distance measuring sensor 923 may be a sensor capable of measuring the distance between the capturing device 920 and the particular object. For example, the distance measuring sensor 923 may be a time-of-flight (ToF) camera or a depth camera.

The positioner 924 may detect the movement of the electronic device and apply the movement to initialized coordinates, thereby computing the position (or coordinates) of the capturing device 920.

Although FIG. 9 illustrates that the distance measuring sensor 923 is included in the capturing device 920, the distance measuring sensor 923 may be included in the electronic device 910 or may be included in each of the electronic device 910 and the capturing device 920. The augmenting system of FIG. 9 is merely an example and may be implemented in other various forms to augment the virtual object in a realistic and stereoscopic manner to fit the direction of the electronic device 910 and the distance to (or the position of) the virtual object.

FIG. 10 is a flowchart schematically illustrating an example method of computing the position of a virtual object according to an embodiment of the present disclosure.

Referring to FIG. 10, according to an embodiment, computing the position of the virtual object may need the distance between the electronic device and the capturing device (or the position of each of the electronic device and the capturing device), the angle of each of the electronic device and the capturing device, and the distance to the real object. In other words, to compute the position of the virtual object, an embodiment of the present disclosure may compute the distance between the electronic device and the capturing device (or the position of each of the electronic device and the capturing device) (S1001), compute the angle (or direction) of the electronic device and the capturing device (S1002), and compute the distance to the real object (S1003) and compute the position of the virtual object corresponding to the real object based on the results of computation. Referring to FIG. 13, for example, the electronic device may compute the position of the virtual object based on the distance 1301 between the electronic device and the capturing device (or a mobile phone), the distance 1302 between the capturing device and the real object, and the angle 1304 of the electronic device and/or the angle 1303 of the capturing device, turn the image or video captured at the angle of the capturing device to the angle 1304 of the electronic device, and display the virtual object 1305.

In this case, the angle (or direction) of each of the electronic device and the capturing device may be detected and computed by a gyro sensor or direction sensor.

According to an embodiment, all of the computations may be performed by the capturing device and the results thereof may be transmitted to the electronic device. Alternatively, the capturing device may transmit the image or video of the virtual object to the electronic device, and the electronic device may perform the above-described computations, so that the virtual object is augmented and displayed in the computed position. Steps S1001 and S1002 may be performed by each of the electronic device and the capturing device, while steps S1003 and S1004 may be performed by the capturing device and the electronic device, respectively. In other words, steps S1001 to S1004 may be implemented by the electronic device and/or capturing device in various manners.

Information or values necessary for the computations may be transmitted and received between the electronic device and the capturing device via wired/wireless communication.

As another example, as the capturing device detects the electronic device, an invisible augmenting mode is triggered. The distance between the capturing device and the electronic device is computed based on the size of the capturing device which is viewed through the camera of the electronic device, logical sensor reference points of the electronic device and the capturing device are initialized. Whenever the capturing device or electronic device moves, the positions of the capturing device and electronic device in the spatial coordinate system are computed. The positions of the capturing device and electronic device may be computed by performing integration using an inertial measurement unit (IMU) and a gyro sensor. The angle at which the capturing device displays and the distance to the object are computed, and the content displayed by the capturing device is augmented to the position which is viewed from the electronic device. If the capturing device has a depth or ToF sensor, the augmented position is the position of the object. If the electronic device has a depth or ToF sensor, the augmented position is the position of a hidden object. If both the capturing device and electronic device lack a depth or ToF sensor, the augmented position is a position in a predetermined constant distance. The video displayed via the capturing device may be augmented and displayed in various manners (e.g., two-dimension (2D), three-dimension (3D), or relevant information).

Step S1001 of FIG. 10 may be largely divided into the step of initializing the coordinates (or position) of each of the electronic device and the capturing device and the step of computing the coordinates considering the movement of each of the electronic device and capturing device. Step S1001 may further include the step of computing the distance between the electronic device and the capturing device based on the coordinates of each of the electronic device and the capturing device.

Before initializing, the electronic device may detect the capturing device and trigger the invisible augmenting mode. The distance between the capturing device and the electronic device may be computed based on the size of the capturing device detected by the camera of the electronic device, and the logical sensor reference points of the electronic device and the capturing device may be initialized.

For example, the coordinates of the electronic device and the capturing device may be initialized by recognizing the capturing device by the camera of the electronic device. Hereinafter, the terms "camera unit" and the "camera" may be interchangeably used. As a specific example, the camera of the electronic device may recognize the capturing device. Then, the electronic device may compare the size of the capturing device, which is shown in the image or video of the recognized capturing device, with the actual size of the capturing device. Next, the electronic device may compute the distance between the electronic device and the capturing device based on the result of comparison. Thereafter, the electronic device may compute relative coordinates of the capturing device based on the distance to the capturing device and may be initialized based on the coordinates. In other words, the logical coordinate system may be initialized by performing computation, with the position taken as a start point at which augmentation is executed on the invisible portion. For example, the coordinates of the electronic device may be initialized to (0, 0, 0), and the coordinates of the capturing device may be initialized to (0, 0, 20).

As another example, the coordinates of the electronic device and the capturing device may be initialized, with the electronic device and the capturing device placed in the same position (or close positions). For example, the user may place the capturing device in the same position as the electronic device. Next, as the user presses a button on the electronic device or capturing device, the coordinates of the electronic device and the capturing device may be initialized to (0, 0, 0). In other words, the logical coordinate system may be initialized by performing computation, with the position taken as a start point at which which augmentation is executed on the invisible portion.

An embodiment of the present disclosure may compute coordinates considering the movement of each of the electronic device and the capturing device. For example, the movement of each of the electronic device and the capturing device may be detected by, e.g., a motion center. Then, the moving distance and/or direction of each of the electronic device and the capturing device may be computed. As denoted with 1201 of FIG. 12, each of the electronic device (or glasses) and capturing device (or a mobile phone) may be initialized, and its current coordinates (or position) may be computed, with the moving distance and/or direction applied to the initialized coordinates as denoted with 1202 of FIG. 12. For example, the current coordinates of the electronic device and the capturing device may be computed by performing integration on the accelerations via an inertial measurement unit (IMU) and a gyro sensor.

According to an embodiment, the distance between the electronic device and the capturing device may be computed based on the current coordinates of each of the electronic device and the capturing device.

FIG. 11 is a flowchart illustrating a specific example of computation of the distance to a real object.

Referring to FIG. 11, step S1003 of FIG. 10 may be performed as follows.

First, the electronic device may identify whether the capturing device has a distance measuring sensor (S1101). The term "distance measuring sensor" as used herein may be interchangeably used with the term "distance measuring sensor unit."

Upon identifying that the capturing device has a distance measuring sensor, the electronic device may request the capturing device to measure the distance from the real object, and the capturing device may measure the distance between the capturing device and the real object via the distance measuring sensor (S1102). Where the position of the virtual object is computed based on the distance d between the capturing device and the real object as shown in FIG. 14, the position of the virtual object may be the same as the position of the real object.

Upon identifying that the capturing device lacks a distance measuring sensor, the electronic device may identify whether the electronic device has a distance measuring sensor (S1103). Where the electronic device has a distance measuring sensor, the electronic device may measure the distance between the electronic device and the real object via the distance measuring sensor (S1104). Where the position of the virtual object is computed based on the distance d between the electronic device and the real object as shown in FIG. 15, the position of the virtual object may be on the surface of the real object. In other words, the electronic device may augment the virtual object to a position proximate to the real object.

Where the electronic device lacks a distance measuring sensor, the electronic device may regard a preset value, default value, or constant as the distance d between the capturing device and the real object (S1105), thereby computing the position of the virtual object. For example, the electronic device may augment the virtual object to the position of the preset value, default value, or constant k as shown in FIG. 16.

Although the above description focuses primarily on the operations of the electronic device, the capturing device may perform the determination of whether a distance measuring sensor is provided or, without such determination, the electronic device or capturing device may measure the distance to the real object according to a preset scheme or simply adopt a preset value.

The electronic device may compute the position of the virtual object based on the distance between the electronic device and the capturing device, the angle of each of the electronic device and the capturing device, and the distance to the real object which have been computed by performing the operations of FIGS. 10 and 11.

Referring to FIG. 17A, the electronic device may turn the image or video of the virtual object to the angle or direction of the electronic device and display the resultant image or video. For example, the electronic device may turn the image or video of the virtual object, which is positioned at the angle (or direction) v2 of the capturing device, to the same angle (or direction) v1 of the electronic device based on a rotation matrix and augment the virtual object to the resultant position as shown in FIG. 17B. In other words, the electronic device may apply the rotation matrix to the image or video received from the capturing device, thereby turning the image or video to the user's viewpoint.

As shown in FIG. 18, the electronic device may model the image or video of the virtual object into a 3D image or video 1801 via the depth camera included in the electronic device or capturing device and augment the model to the computed position.

For example, FIG. 19A illustrates a result obtained by modeling object information (or object) input through the depth camera. FIG. 19B illustrates an object modeled by applying pre-mapped information to, or performing matching on, the shown information. The direction of the object information shown in 2D may be modified to fit the direction the user views, and the object information may be shown in the modified direction. As shown in FIG. 19B, the electronic device may transmit information received through the camera to a system, e.g., a server device (or software), and the system may analyze the image or video and transmit the operation information for the shown image or video to the electronic device.

Thus, an embodiment of the present disclosure may implement realistic, 3D augmented reality based on the computed position of the virtual object.

FIG. 20 is a flowchart illustrating an augmenting method by an electronic device according to an embodiment of the present disclosure.

Referring to FIG. 20, the electronic device computes the distance between the electronic device and the capturing device connected with the electronic device via wired/wireless communication (S2001).

The electronic device then receives the angle of the capturing device and computes the angle of the electronic device (S2002).

Next, the electronic device determines information related to the distance to the real object captured by the capturing device (S2003).

Thereafter, the electronic device computes an augmented position for the virtual object corresponding to the real object (S2004).

The electronic device then displays the virtual object in the augmented position on the display (S2005). The display may refer to a device capable of displaying images or videos. For example, the display may be a display device.

The angle of the virtual object may be changed from the angle of the capturing device to the angle of the electronic device, and the reangled virtual object may be displayed.

The virtual object may be stereoscopically displayed in the augmented position.

Step S2001 may include computing the distance between the electronic device and the capturing device based on positions of the capturing device and the electronic device.

Computing the distance between the capturing device and the AR device may include initializing the positions of the capturing device and the AR device and computing the positions, with movements of the capturing device and the AR device applied to the initialized positions.

The distance-related information may include at least one of a distance between the real object and the AR device, a distance between the real object and the capturing device, or a preset value.

Step S2004 may include computing the augmented position based on the distance between the capturing device and the electronic device, the angle of the capturing device, the angle of the electronic device, and the distance-related information.

The augmenting method may further include receiving, from a network, downlink control information (DCI) used for scheduling reception of an image of the virtual object, wherein the image of the virtual object may be received from the network based on the DCI.

The augmenting method may further include performing an initial access procedure with the network based on a synchronization signal block (SSB), wherein the image of the virtual object may be received from the network via a physical uplink shared channel (PUSCH), and demodulation-reference signals (DM-RSs) of the SSB and the PUSCH may be quasi co-located (QCL) for QCL type D.

The augmenting method by the electronic device described above in connection with FIG. 20 is substantially the same as the method of operation of the electronic device described above in connection with FIGS. 1 to 19 and no detailed description thereof is thus presented below.

FIG. 21 is a block diagram illustrating an electronic device according to an embodiment.

Referring to FIG. 21, an electronic device 2100 includes a transceiver 2110 for transmitting or receiving wireless signals and a processor 2120 functionally connected with the transceiver. The processor computes a distance between the electronic device and a capturing device connected with the electronic device via wired/wireless communication, receives an angle of the capturing device and computes an angle of the AR device, determines information related to a distance to a real object captured by the capturing device, computes an augmented position of a virtual object corresponding to the real object, and controls the display to display the virtual object in the augmented position.

The operations of the electronic device described above in connection with FIG. 21 are substantially the same as the operations of the electronic device described above in connection with FIGS. 1 to 20 and no detailed description thereof is thus presented below.

Embodiment 1: A method for controlling an augmented reality (AR) device worn on a user's head and having a display comprises computing a distance between the AR device and a capturing device connected with the AR device via wired/wireless communication, receiving an angle of the capturing device and computing an angle of the AR device, determining information related to a distance to a real object captured by the capturing device, computing an augmented position of a virtual object corresponding to the real object, and displaying the virtual object in the augmented position on the display.

Embodiment 2: In embodiment 1, the virtual object may be turned from the angle of the capturing device to the angle of the electronic device and be displayed.

Embodiment 3: In embodiment 2, the virtual object may be stereoscopically displayed in the augmented position.

Embodiment 4: In embodiment 1, computing the distance between the capturing device and the AR device may include computing the distance between the capturing device and the AR device based on positions of the capturing device and the AR device.

Embodiment 5: In embodiment 4, computing the distance between the capturing device and the AR device may include initializing the positions of the capturing device and the AR device and computing the positions, with movements of the capturing device and the AR device applied to the initialized positions.

Embodiment 6: In embodiment 1, the distance-related information may include at least one of a distance between the real object and the AR device, a distance between the real object and the capturing device, or a preset value.

Embodiment 7: In embodiment 1, computing the augmented position of the virtual object corresponding to the real object may include computing the augmented position based on the distance between the capturing device and the AR device, the angle of the capturing device, the angle of the AR device, and the distance-related information.

Embodiment 8: In embodiment 1, the method may further comprise receiving, from a network, downlink control information (DCI) used for scheduling reception of an image of the virtual object, wherein the image of the virtual object may be received from the network based on the DCI.

Embodiment 9: In embodiment 8, the method may further comprise performing an initial access procedure with the network based on a synchronization signal block (SSB), wherein the image of the virtual object may be received from the network via a physical uplink shared channel (PUSCH), and demodulation-reference signals (DM-RSs) of the SSB and the PUSCH may be quasi co-located (QCL) for QCL type D.

Embodiment 10: An electronic device worn on a user's head and having a display comprises a transceiver for transmitting or receiving a wireless signal and a processor functionally connected with the transceiver, wherein the processor computes a distance between the electronic device and a capturing device connected with the electronic device via wired/wireless communication, receives an angle of the capturing device and computes an angle of the AR device, determines information related to a distance to a real object captured by the capturing device, computes an augmented position of a virtual object corresponding to the real object, and controls the display to display the virtual object in the augmented position.

Embodiment 11: In embodiment 10, the virtual object may be turned from the angle of the capturing device to the angle of the electronic device and be displayed.

Embodiment 12: In embodiment 11, the virtual object may be stereoscopically displayed in the augmented position.

Embodiment 13: In embodiment 10, the processor may compute the distance between the electronic device and the capturing device based on positions of the capturing device and the electronic device.

Embodiment 14: In embodiment 10, the processor may initialize the positions of the capturing device and the electronic device and compute the positions, with movements of the capturing device and the electronic device applied to the initialized positions.

Embodiment 15: In embodiment 10, the distance-related information may include at least one of a distance between the real object and the AR device, a distance between the real object and the capturing device, or a preset value.

Embodiment 16: In embodiment 10, the processor may compute the augmented position based on the distance between the capturing device and the electronic device, the angle of the capturing device, the angle of the electronic device, and the distance-related information.

Embodiment 17: In embodiment 10, the processor may control to receive, from a network, downlink control information (DCI) used for scheduling reception of an image of the virtual object, wherein the image of the virtual object may be received from the network based on the DCI.

Embodiment 18: In embodiment 17, the processor may control to perform an initial access procedure with the network based on a synchronization signal block (SSB), wherein the image of the virtual object may be received from the network via a physical uplink shared channel (PUSCH), and demodulation-reference signals (DM-RSs) of the SSB and the PUSCH may be quasi co-located (QCL) for QCL type D.

Some of the above-described embodiments are interpreted as excluding or distinguishing from other embodiments. The components or functions in some embodiments described above may be used together or combined with the components or functions in other embodiments.

For example, component A described in connection with a particular embodiment and the drawings may be combined or merged with component B described in connection with another embodiment and the drawings. In other words, a combination of components, although not explicitly described, may be rendered possible unless stated as impossible.

Thus, the above description should be interpreted not as limiting in all aspects but as exemplary. The scope of the present disclosure should be determined by reasonable interpretations of the appended claims and all equivalents of the present disclosure belong to the scope of the present disclosure.

The invention claimed is:

1. A method for controlling an augmented reality (AR) device worn on a user's head and having a display, the method comprising:
   computing a distance between the AR device and a capturing device connected with the AR device via wired/wireless communication;
   receiving an angle of the capturing device and computing an angle of the AR device;
   determining information related to a distance to a real object captured by the capturing device;
   computing an augmented position of a virtual object corresponding to the real object; and
   displaying the virtual object in the augmented position on the display.

2. The method of claim 1, wherein the virtual object is turned from the angle of the capturing device to the angle of the AR device and is displayed.

3. The method of claim 2, wherein the virtual object is stereoscopically displayed in the augmented position.

4. The method of claim 1, wherein computing the distance between the capturing device and the AR device includes computing the distance between the capturing device and the AR device based on positions of the capturing device and the AR device.

5. The method of claim 4, wherein computing the distance between the capturing device and the AR device includes:
   initializing the positions of the capturing device and the AR device; and
   computing the positions, with movements of the capturing device and the AR device applied to the initialized positions.

6. The method of claim 1, wherein the distance-related information includes at least one of a distance between the real object and the AR device, a distance between the real object and the capturing device, or a preset value.

7. The method of claim 1, wherein computing the augmented position of the virtual object corresponding to the real object includes computing the augmented position based on the distance between the capturing device and the AR device, the angle of the capturing device, the angle of the AR device, and the distance-related information.

8. The method of claim 1, further comprising receiving, from a network, downlink control information (DCI) used for scheduling reception of an image of the virtual object, wherein the image of the virtual object is received from the network based on the DCI.

9. The method of claim 8, further comprising performing an initial access procedure with the network based on a synchronization signal block (SSB), wherein the image of the virtual object is received from the network via a physical uplink shared channel (PUSCH), and wherein demodulation-reference signals (DM-RSs) of the SSB and the PUSCH are quasi co-located (QCL) for QCL type D.

10. An electronic device worn on a user's head and having a display, the electronic device comprising:
   a transceiver for transmitting or receiving a wireless signal; and
   a processor functionally connected with the transceiver, wherein the processor:
   computes a distance between the electronic device and a capturing device connected with the electronic device via wired/wireless communication;
   receives an angle of the capturing device and computes an angle of the AR device;
   determines information related to a distance to a real object captured by the capturing device;
   computes an augmented position of a virtual object corresponding to the real object; and
   controls the display to display the virtual object in the augmented position.

11. The electronic device of claim 10, wherein the virtual object is turned from the angle of the capturing device to the angle of the electronic device and is displayed.

12. The electronic device of claim 11, wherein the virtual object is stereoscopically displayed in the augmented position.

13. The electronic device of claim 10, wherein the processor computes the distance between the electronic device and the capturing device based on positions of the capturing device and the electronic device.

14. The electronic device of claim 10, wherein the processor initializes the positions of the capturing device and the electronic device and computes the positions, with movements of the capturing device and the electronic device applied to the initialized positions.

15. The electronic device of claim 10, wherein the distance-related information includes at least one of a distance between the real object and the electronic device, a distance between the real object and the capturing device, or a preset value.

16. The electronic device of claim 10, wherein the processor computes the augmented position based on the distance between the capturing device and the electronic device, the angle of the capturing device, the angle of the electronic device, and the distance-related information.

17. The electronic device of claim 10, wherein the processor controls to receive, from a network, downlink control information (DCI) used for scheduling reception of an image of the virtual object, wherein the image of the virtual object is received from the network based on the DCI.

18. The electronic device of claim 17, wherein the processor controls to perform an initial access procedure with the network based on a synchronization signal block (SSB), wherein the image of the virtual object is received from the network via a physical uplink shared channel (PUSCH), and wherein demodulation-reference signals (DM-RSs) of the SSB and the PUSCH are quasi co-located (QCL) for QCL type D.

* * * * *